UNITED STATES PATENT OFFICE.

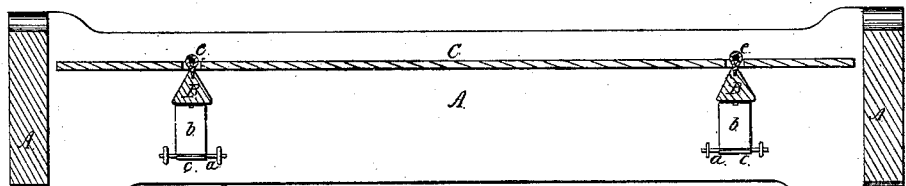
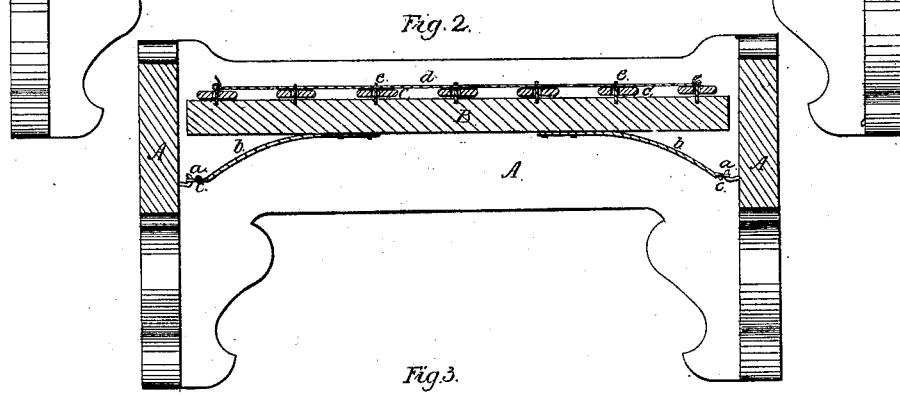
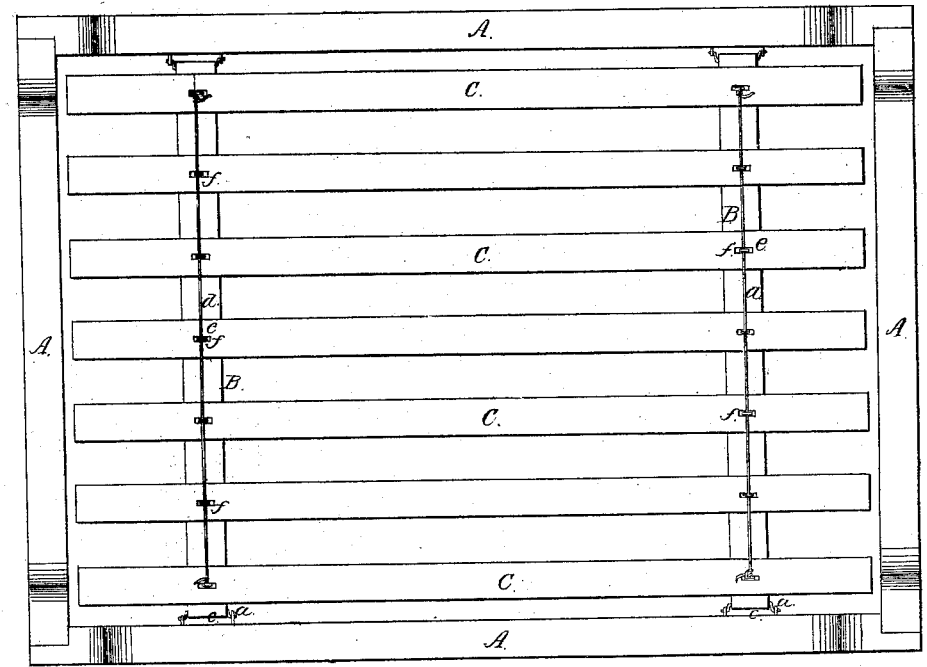

JOHN DANNER AND SAMUEL DANNER, OF CANTON, OHIO.

IMPROVEMENT IN SPRING BED-BOTTOMS.

Specification forming part of Letters Patent No. 57,875, dated September 11, 1866.

*To all whom it may concern:*

Be it known that we, JOHN DANNER and SAMUEL DANNER, of Canton, in the county of Stark and State of Ohio, have invented certain new and useful Improvements in Bed-Bottoms; and we do hereby declare the following to be a full, clear, and exact description of the same, reference being had to the accompanying drawings, making a part of this specification, in which—

Figure 1 represents a vertical longitudinal section of the bedstead and bed-bottom connected thereto. Fig. 2 represents a vertical cross-section; and Fig. 3 represents a top plan thereof.

Similar letters of reference, where they occur in the separate drawings, denote like parts in all.

Our invention consists in the manner in which we unite the longitudinal slats to the spring-bars at or near the head and foot of the bedstead, so as to allow them the necessary play, and to hold them in place, while they are readily removable for taking down or cleansing the bedstead.

To enable others skilled in the art to make and use our invention, we will proceed to describe the same with reference to the drawings.

A represents a bedstead of any of the usual well-known forms, shapes, or material, to the sides of which, at or near each end thereof, are arranged hinged links or bars $a\ a\ a\ a$. B are bars of wood, with curved or quarter-elliptic springs $b\ b$ attached to their lower sides, the free ends $c\ c$ of which springs are bent around so as to hook onto or catch over the hinged bars, links, or loops $a\ a$.

We prefer to make the wooden supporting or cross bars B of the form shown in the section in Fig. 1—namely, of an angular or inclined shape—so that the upper side will afford a very small frictional support to the slats C that lie upon them, and thus allow the slats to move on them as they (the slats) yield to the superincumbent weight on the bed. In the crown or apex of the supporting cross-pieces B are arranged a series of staples or dead-eyes, $e$, or their equivalent devices, which should project a short distance above the slats $c$ when they are placed thereon. Through the slats $c$ we cut longitudinal slots $f$, that will receive the staples or equivalent devices $e$, and, besides, allow for end play or motion to the slats. When the slats are laid in place on the bearing-pieces B a piece of twine or tape or other flexible thing, $d$, is run through the staples or dead-eyes or other holding device, and the whole bed-bottom is arranged for use, it having free motion to yield to the weight or shape of the person or persons occupying the bed, and can be taken down or set up in a few moments.

Instead of allowing the staples to project above the slats there may be slight depressions in the slats themselves for the twine to lie in, and thus prevent the bed from being worn by the staples.

If the bedsteads are made of iron, then we would make the bearing-pieces B of light T or L shaped iron, or "angle-iron," as it is termed, which would not be heavier than the wooden bearers, and be less liable to break or bend; or such angle-iron may be used with wooden bedsteads.

Having thus fully described our invention, what we claim therein as new, and desire to secure by Letters Patent, is—

Supporting the longitudinal slats upon spring-bearers or cross-pieces, and holding them thereto, so that they may move endwise thereon, by means of the staples, long slots, and cord or twine, or their substantial equivalents, as herein described and represented.

JOHN DANNER.
SAMUEL DANNER.

Witnesses:
W. W. CLARK,
J. ABBOTT.